United States Patent
Saxena et al.

(10) Patent No.: US 9,767,543 B2
(45) Date of Patent: Sep. 19, 2017

(54) METHOD AND APPARATUS FOR ENHANCING IMAGES VIA WHITE POP-OUT

(71) Applicant: Samsung Electronics Co., Ltd, Suwon-si (KR)

(72) Inventors: Ankur Saxena, Dallas, TX (US); Hossein Najaf-Zadeh, Allen, TX (US); Madhukar Budagavi, Plano, TX (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/001,040

(22) Filed: Jan. 19, 2016

(65) Prior Publication Data

US 2017/0084011 A1 Mar. 23, 2017

Related U.S. Application Data

(60) Provisional application No. 62/222,054, filed on Sep. 22, 2015.

(51) Int. Cl.
*G06K 9/40* (2006.01)
*G06T 5/00* (2006.01)
*H04N 1/60* (2006.01)

(52) U.S. Cl.
CPC .......... *G06T 5/009* (2013.01); *H04N 1/6005* (2013.01); *G06T 2207/20208* (2013.01)

(58) Field of Classification Search
CPC .......... G06T 5/009; G06T 2207/20208; H04N 1/6005
See application file for complete search history.

(56) References Cited

U.S. PATENT DOCUMENTS

| | | |
|---|---|---|
| 2012/0176399 A1 | 7/2012 | Whitehead et al. |
| 2014/0079113 A1 | 3/2014 | Newton et al. |
| 2015/0103919 A1 | 4/2015 | Hattori et al. |
| 2015/0206295 A1* | 7/2015 | Shah ............... G06T 5/009 |
| | | 382/166 |
| 2015/0245004 A1 | 8/2015 | Guo et al. |
| 2015/0256807 A1 | 9/2015 | Honji |
| 2016/0021391 A1* | 1/2016 | Su .................. H04N 19/86 |
| | | 375/240.12 |

(Continued)

FOREIGN PATENT DOCUMENTS

JP 2014519620 A 8/2014

OTHER PUBLICATIONS

Rec. ITU-R BT.601-5, Studio Encoding Parameters of Digital Television for Standard 4:3 and Wide-screen 16:9 Aspect Ratios, (1982-1986-1990-1992-1994-1995); 16 pp.

(Continued)

*Primary Examiner* — Phuoc Tran (57) ABSTRACT

A user equipment (UE) includes a receiver and a processor. The receiver is configured to receive a standard dynamic range (SDR) image and metadata related to an HDR image. The processor is configured to identify relevant portions of the SDR image to be enhanced based on the metadata related to the HDR image. The processor is also configured to increase an intensity of the relevant portions of the SDR image to create an enhanced SDR image. The processor is also configured to output the enhanced SDR image to a display.

20 Claims, 9 Drawing Sheets

(56) References Cited

U.S. PATENT DOCUMENTS

2017/0018109 A1* 1/2017 Aiba ................ G06T 11/60

OTHER PUBLICATIONS

The International Searching Authority, "International Search Report," International Application No. PCT/KR2016/010565, Jan. 4, 2017, 3 pages, publisher the ISA/KR, International Application Division, Korean Intellectual Property Office, Daejeon, Republic of Korea.
The International Searching Authority, "Written Opinion," International Application No. PCT/KR2016/010565, Jan. 4, 2017, 6 pages, publisher the ISA/KR, International Application Division, Korean Intellectual Property Office, Daejeon, Republic of Korea.

* cited by examiner

METHOD AND APPARATUS FOR ENHANCING IMAGES VIA WHITE POP-OUT

CROSS-REFERENCE TO RELATED APPLICATION(S) AND CLAIM OF PRIORITY

This application claims priority under 35 U.S.C. §119(e) to U.S. Provisional Patent Application No. 62/222,054 filed on Sep. 22, 2015. The above-identified provisional patent application is hereby incorporated by reference in its entirety.

TECHNICAL FIELD

This disclosure relates generally to image enhancement. More specifically, this disclosure relates to a method and apparatus for enhancing images via white pop-out.

BACKGROUND

Currently, new High Dynamic range (HDR) cameras and displays are becoming prominent. HDR cameras can capture low to high intensities such as from 0.01 to around 10,000 nits. While studios are primarily creating HDR content, due to the high cost of the HDR cameras and displays, they have not yet reached normal consumers Furthermore, a majority of the content is Standard Dynamic Range (SDR). While there are many algorithms for inverse tone mapping to convert the SDR content to HDR for displaying on HDR displays, most consumers still have SDR displays. It is also expected that the HDR displays will be considerably expensive than the SDR displays for a long time, and the normal consumer will have access to SDR displays only.

SUMMARY

This disclosure provides method and apparatus for image enhancement via white pop-out.

In a first embodiment, a user equipment (UE) includes a receiver and a processor. The receiver is configured to receive a standard dynamic range (SDR) image and metadata related to an HDR image. The processor is configured to identify relevant portions of the SDR image to be enhanced based on the metadata related to the HDR image. The processor is also configured to increase an intensity of the relevant portions of the SDR image to create an enhanced SDR image. The processor is also configured to output the enhanced SDR image to a display.

In a second embodiment, a method provides image enhancement. The method includes receiving a standard dynamic range (SDR) image and metadata related to an HDR image. The method also includes identifying relevant portions of the SDR image to be enhanced based on the metadata related to the HDR image. The method also includes increasing an intensity of the relevant portions of the SDR image to create an enhanced SDR image. The method also includes outputting the enhanced SDR image to a display.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is fixated from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
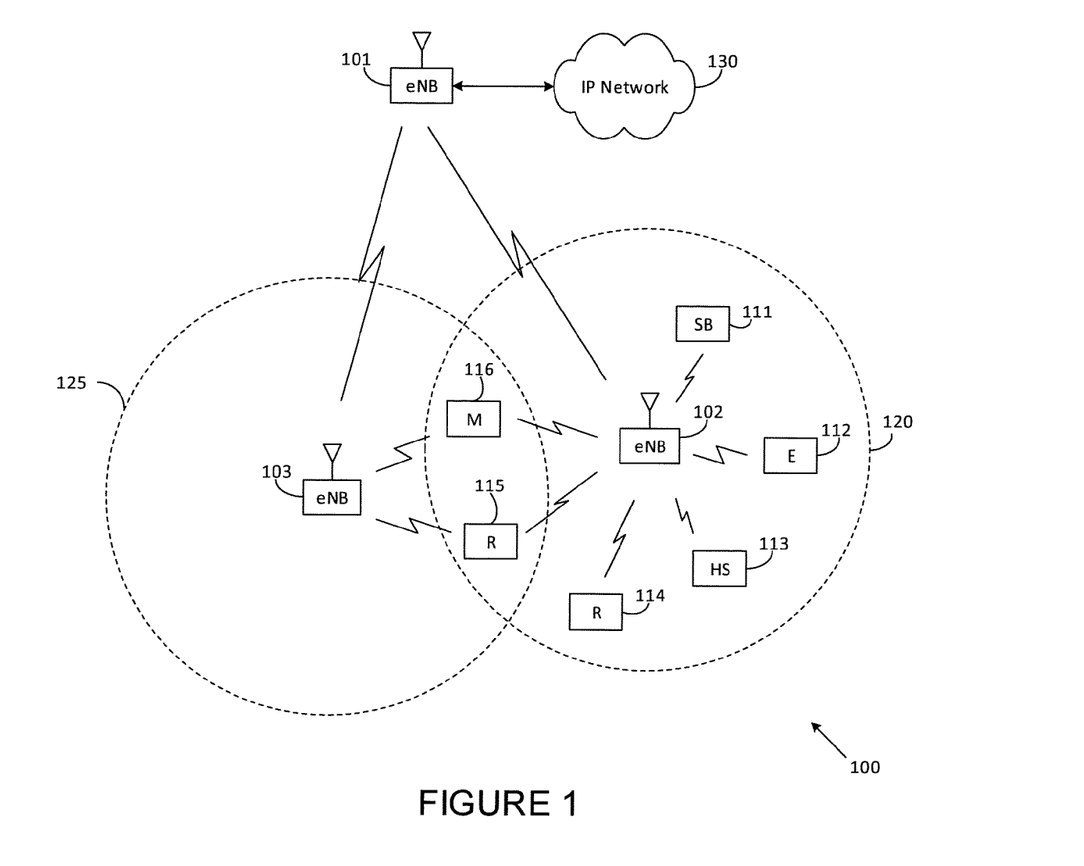
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," "television" or "user device." For the sake of convenience, the terms "user equipment" and "UE" are used in this patent document to refer to a television, display, monitor, or other such wired or wireless devices. The UE can be in communication with another UE, such as a mobile device, or other television.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and manmade obstructions.

One or more embodiments of this disclosure provide methods and apparatuses to performing post-processing of SDR content to give an HDR effect on SDR displays. In one example, the white portions of the SDR image are enhanced to have a brighter (or closer to pure white) nature. As used herein, one or more embodiments of this disclosure refers to an SDR or HDR image. However, different embodiments of this disclosure can also be used with video. When referencing an image herein, whether SDR or HDR, the different embodiments of this disclosure could be referring to a frame within a video for a given frame rate (number of pictures per unit of time).

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
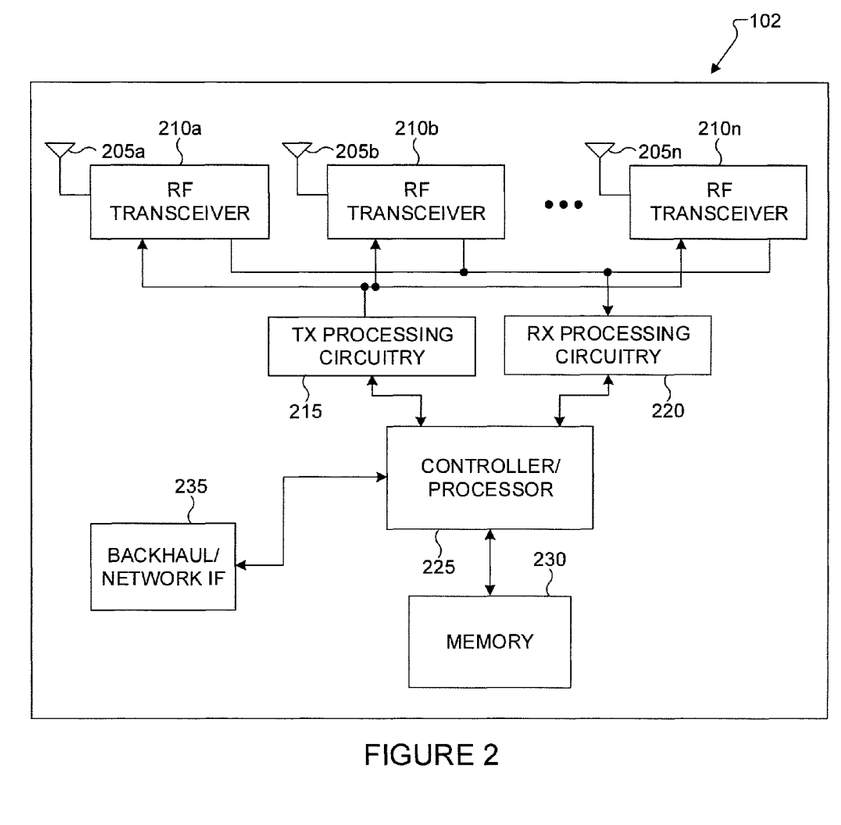
FIG. 2 illustrates an example eNodeB (eNB) according to this disclosure.

FIG. 2 illustrates an example eNB 102 according to this disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver or receiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
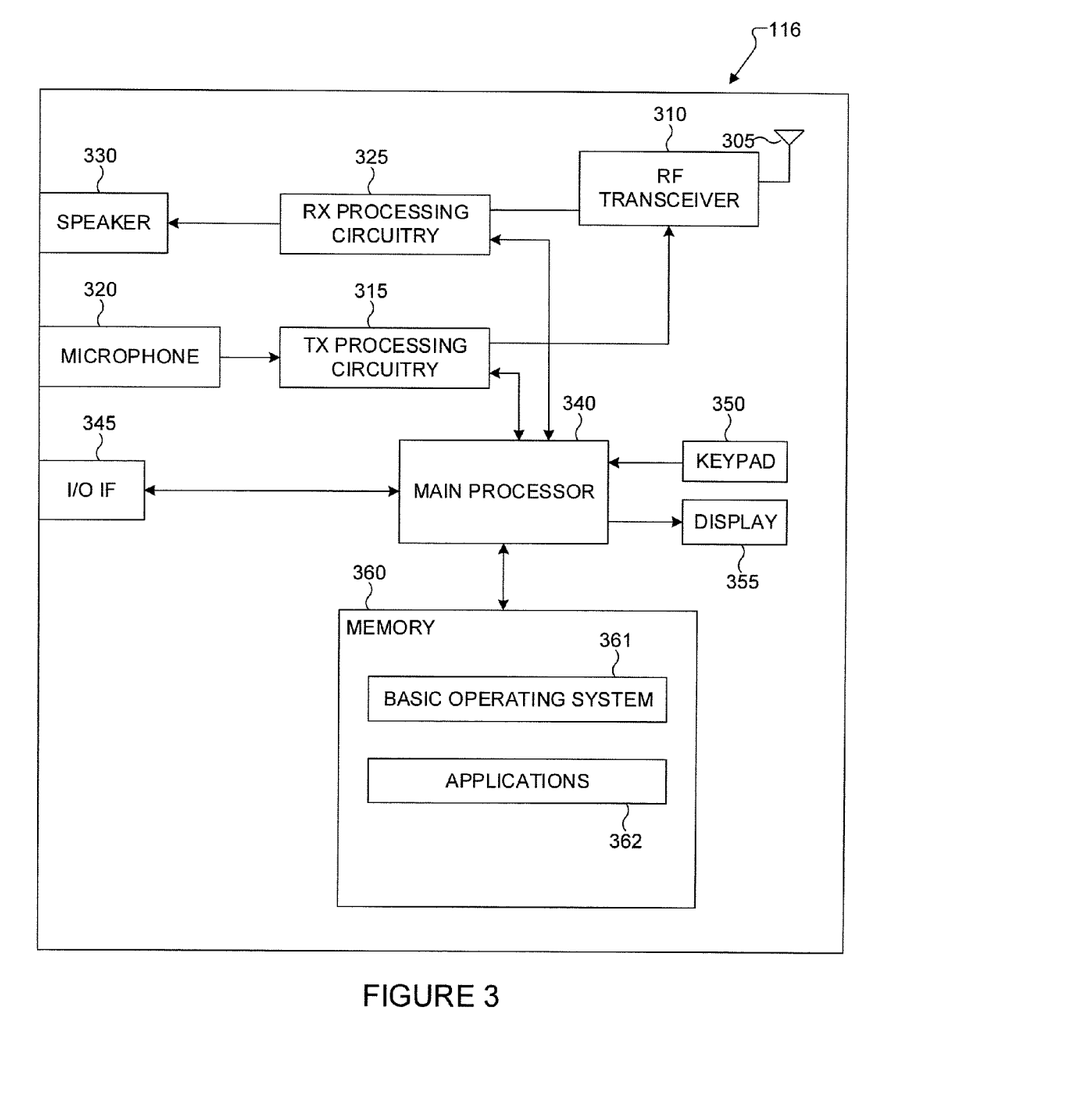
FIG. 3 illustrates an example user equipment (UE) according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE. In one or more embodiments of this disclosure, the UE 116, or any of UEs 111-115, can be a television.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 or receiver receives, from the antenna 305, an incoming RF signal transmitted by an eNB of the network 100. The RF transceiver 310 or receiver down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites. In one embodiment, the keypad 350 could also be a touchscreen. The touchscreen could include a touch panel, a (digital) pen sensor, a key, or an ultrasonic input device. The touchscreen could recognize, for example, a touch input in at least one scheme among a capacitive scheme, a pressure sensitive scheme, an infrared scheme, or an ultrasonic scheme. The touchscreen could also include a control circuit. In the capacitive scheme, the touchscreen could recognize touch or proximity.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices. In another example embodiment, when UE 116 is a television, the UE 116 may not include a transceiver, keypad, or microphone. The UE 116 may include a receiver or decoder without a transmitter or encoder.

Figure 4:
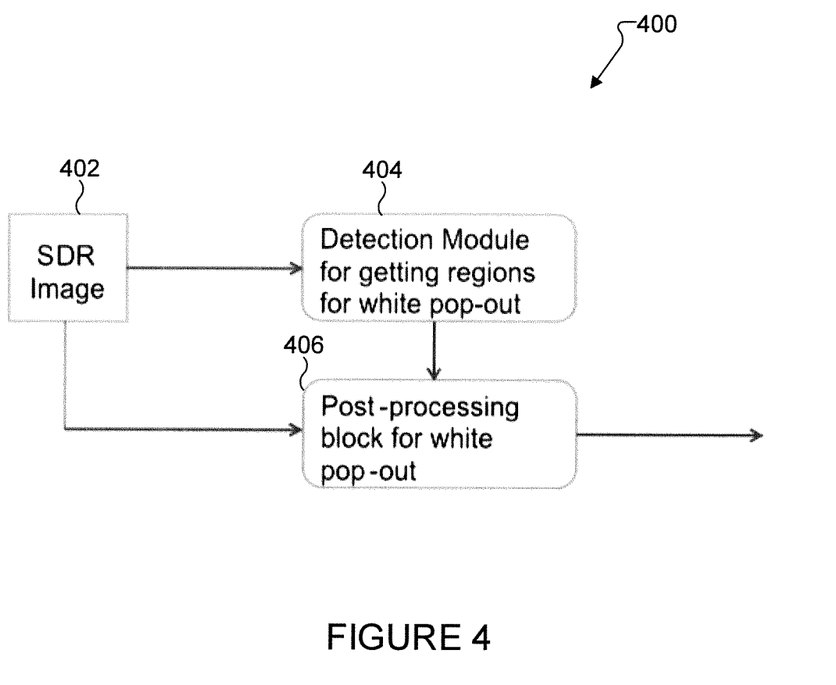
FIG. 4 illustrates an example system for processing an image according to an embodiment of this disclosure.

FIG. 4 illustrates an example system 400 for processing an image 402 according to an embodiment of this disclosure. The embodiment of the system 400 illustrated in FIG. 4 is for illustration only, the system 400 comes in a wide variety of configurations, and FIG. 4 does not limit the scope of this disclosure to any particular implementation of a system for processing an image.

In an embodiment of this disclosure, system 400 includes a detection module 404 and a post-processing module 406. The detection module 404 and post-processing module 406 can be implemented as part of or by a processor, such as, for example, main processor 340 as shown in FIG. 3. The image 402 can be a standard dynamic range (SDR) image. In other embodiments, other types of image can be used, such as a high dynamic range (HDR) image.

The detection module 404 can detect the relevant portions, which may be desirable for enhancement, of an image 402. For example, in one embodiment, the detection module 404 can identify only the white portions from image 402. These white portions and the portions surrounding the white portions are enhanced by post-processing module 404. The enhancement can be increasing the luminance (nits) of the relevant portions of the image 402.

In this example embodiment, the white portions are the relevant portions. The relevant portions can be identified by a predetermined value. For example, the relevant portions can be identified by a luminance In this example, the portions of image 402 with a luminance greater than a threshold level can be identified as relevant portions. The detection module 404 can segment such relevant portions from other parts of the image 402. In other examples, the detection module 404 may identify portions with a luminance less than a threshold level. In other embodiments, the detection module 404 may identify portions of chrominance compared to threshold levels. The detection module 404 can use portions of chrominance, luminance, or both when identifying portions for enhancement. The detection module 404 can use different masks to identify the relevant portions of image 402.

The post-processing module 406 can enhance the relevant portions of the image 402 by applying an enhancement factor to the relevant portions. For example, in an image where white portions are identified as relevant portions, post-processing module can enhance the white portions using the enhancement factor.

Figure 5:
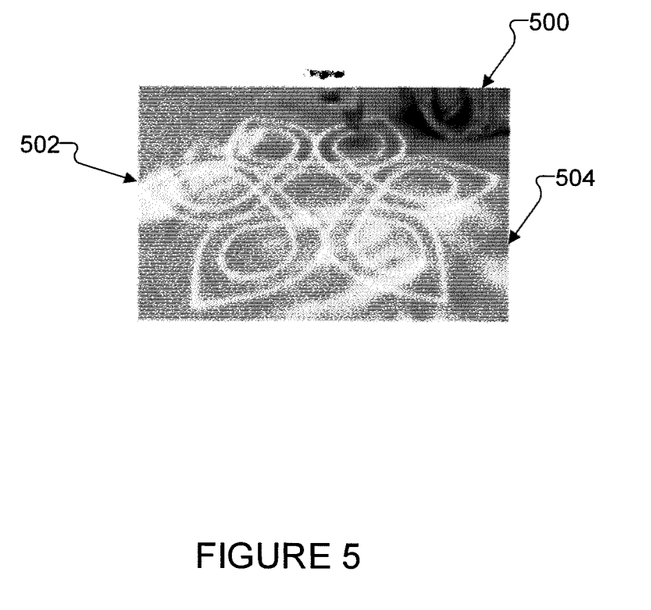
FIG. 5 illustrates an example image to be enhanced according to an embodiment of this disclosure.

FIG. 5 illustrates an example image 500 to be enhanced according to an embodiment of this disclosure. The embodiment of the image 500 illustrated in FIG. 5 is for illustration only, the image 500 comes in a wide variety of configurations, and FIG. 5 does not limit the scope of this disclosure to any particular implementation of a system for processing an image.

In an embodiment of this disclosure, image 500 includes relevant portions 502 and non-relevant portions 504. The image 500 is an image before a detection module, such as, for example, detection module 404 as shown in FIG. 4, identifies relevant portions. In one example, image 500 can be an SDR image.

Figure 6:
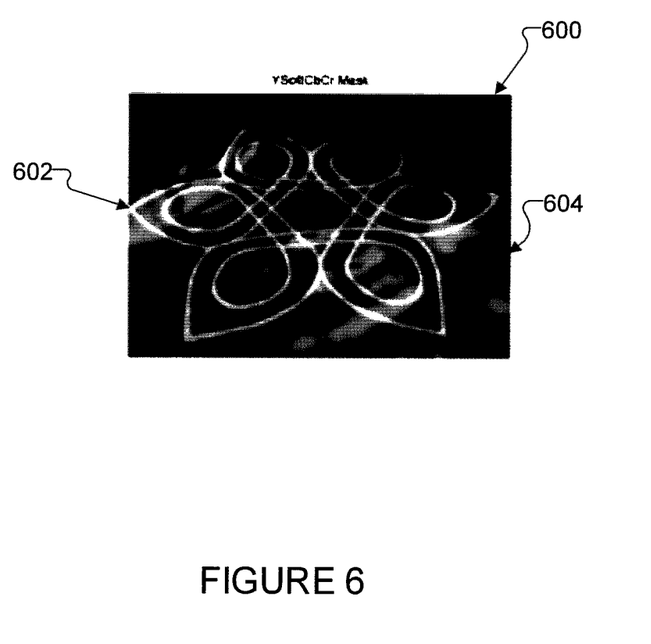
FIG. 6 illustrates an example mask for enhancement according to an embodiment of this disclosure.

FIG. 6 illustrates an example mask 600 for enhancement according to an embodiment of this disclosure. The embodiment of the mask 600 illustrated in FIG. 6 is for illustration only, the mask 600 comes in a wide variety of configurations, and FIG. 6 does not limit the scope of this disclosure to any particular implementation of a system for processing an image.

In an embodiment of this disclosure, mask 600 includes relevant portions 602 and non-relevant portions 604. The mask 600 is a mask of an image after a detection module, such as, for example, detection module 404 as shown in FIG. 4, identifies relevant portions. In different examples, mask 600 can be a mask of an HDR image or an SDR image.

In one example embodiment, a detection module can use YCbCr color space for detection of the relevant portions 602 close to white. In this example, the image has been converted from RGB to YCbCr. In different embodiments, the detection module can use images in RGB and LAB color spaces. In the YCbCr space, the detection module can identify portions of the image (the mask) to be enhanced by using the following equations.

The masks of Y, Cb, Cr and the final overall mask from all components can be referred to as $mask_y$, $mask_{Cb}$, $mask_{Cr}$, and $mask_o$, respectively. Each of these masks is an array of size W×H where W is a width of the original input image, such as image 502 as shown in FIG. 5, and H is a height of the input image. The input image can be an HDR or SDR image.

Mask in Luminance (Y):
$mask_y=1$ if $Y>Y>YThr_{Max}$
$mask_y=0$ if $Y<YThr_{Min}$
$mask_y=(Y-YThr_{Min})/(YThr_{Max}-YThr_{Min})$ otherwise Mask in Cb:
$mask_{Cb}=0$ if $Cb<=CbThr_{Min}-CbGuard$
$mask_{Cb}=1-((CbThr_{Min}-Cb)/CbGuard)$ if $CbThr_{Min}-CbGuard$
$mask_{Cb}=1$ if $CbThr_{Min}<=Cb<=CbThr_{Max}$
$mask_{Cb}=1-((Cb-CbThr_{Max})/CbGuard)$ if $CbThr_{Max}<=Cb<=CbThr_{Max}+CbGuard$
$mask_{Cb}=0$ if $CbThr_{Max}+CbGuard<=Cb$ Mask in Cr:
$mask_{Cr}=0$ if $Cr<=CrThr_{Min}-CrGuard$
$mask_{Cr}=1-((CrThr_{Min}-Cr)/CrGuard)$ if $CrThr_{Min}-CrGuard<Cr<CrThr_{Min}$
$mask_{Cr}=1$ if $CrThr_{Min}<=Cr<=CrThr_{Max}$
$mask_{Cr}=1-((Cr-CrThr_{Max})/CrGuard)$ if $CrThr_{Max}<=Cr<=CrThr_{Max}+CrGuard$
$mask_{Cr}=0$ if $CrThr_{Max}+CrGuard<=Cr$ Overall Mask:
$m_o=mask_y*mask_{Cb}*mask_{Cr}$ In the above expressions, the pixel location (i,j) has been omitted from each mask for notational simplicity (e.g., Y is used instead of Y(i,j)). $Thr_{Max}$ and $Thr_{Min}$ denote the maximum and minimum thresholds for defining a soft mask for each mask. Guard denotes the guard band for defining a soft mask for each mask.

Figure 7A:
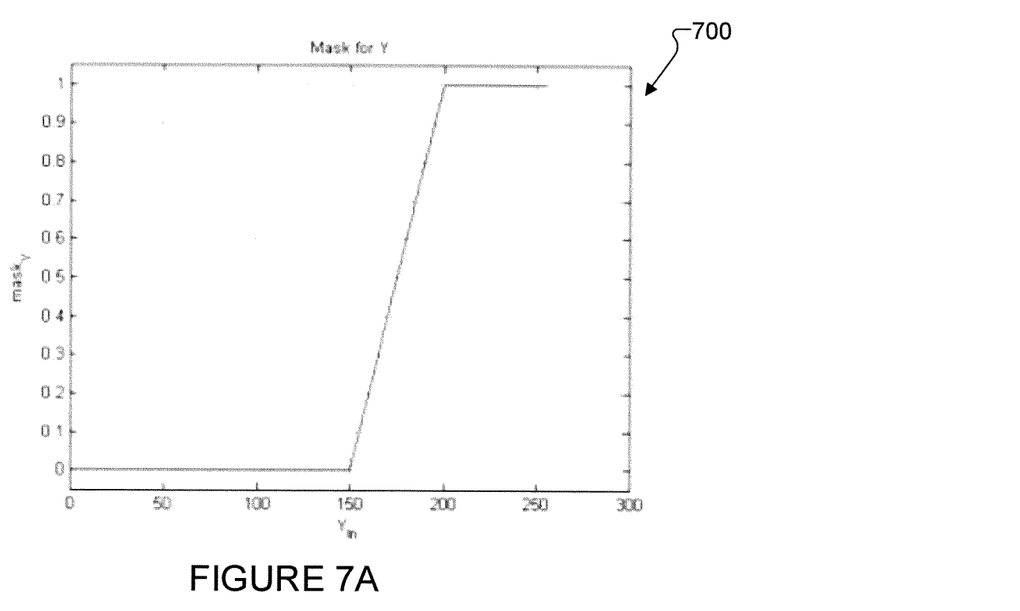
FIGS. 7A and 7B illustrate example charts for enhancement portions according embodiments of this disclosure.
Figure 7B:
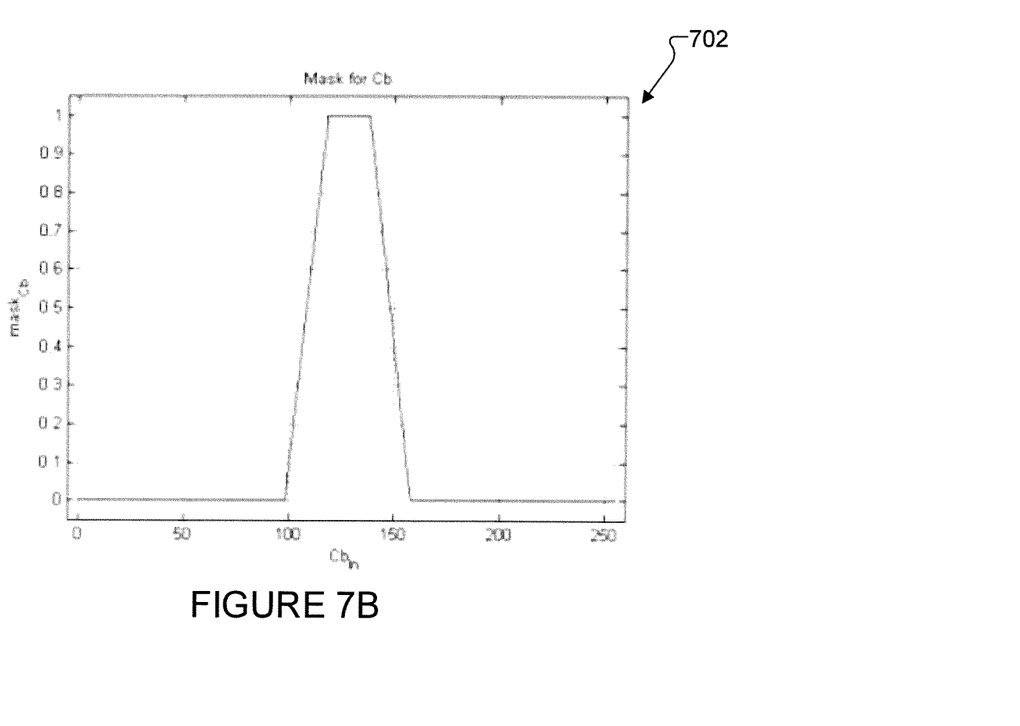

FIGS. 7A and 7B illustrate example charts 700 and 702 for enhancement portions according embodiments of this disclosure. The embodiments of the charts 700 and 702 illustrated in FIGS. 7A and 7B are for illustration only. Charts 700 and 702 come in a wide variety of configurations, and FIGS. 7A and 7B do not limit the scope of this disclosure to any particular implementation of a system for processing an image.

In an embodiment of this disclosure, chart 700 illustrates luminance $Y_{in}$ values corresponding to $mask_y$ values. The chart 702 illustrates luminance $Cb_{in}$ values corresponding to $mask_{cb}$ values. Even though only charts for deriving the masks for Y and Cb are shown, charts for Cr may be similar to Cb. In this example, the mask in chart 700 for Y is a soft and not binary mask, since a hard mask may cause artifacts at the mask boundaries in the image. In different embodiments, the detection module may also use hard masks. In many images, the variation across edges is gradual, so a soft mask would be beneficial under these circumstances.

For Cb (and similarly for Cr), $CbThr_{Min}$, $CbThr_{Max}$, CbGuard define the thresholds and length of guard band for soft mask in Cb space. In this example embodiment, charts 700 and 702 sue $YThr_{Max}$=200; $YThr_{Min}$=150; $CbThr_{Min}$=$CrThr_{Min}$=118; $CbThr_{Max}$=$CrThr_{Max}$=138; and CbGuard=CrGuard=20. These values enhance the portion in the vicinity of white color because pure white color is represented as (255,128,128) in YCbCr space. Indifferent embodiments, different values and thresholds can be used for masks by a detection module.

In this example, the mask is a gray-scale picture with real-valued pixel values between 0 and 1. The brighter portions in the mask (closer to 1) depict the portion to be enhanced by the post-processing enhancement module, while the darker portions (closer to 0) remain untouched.

Figure 8:
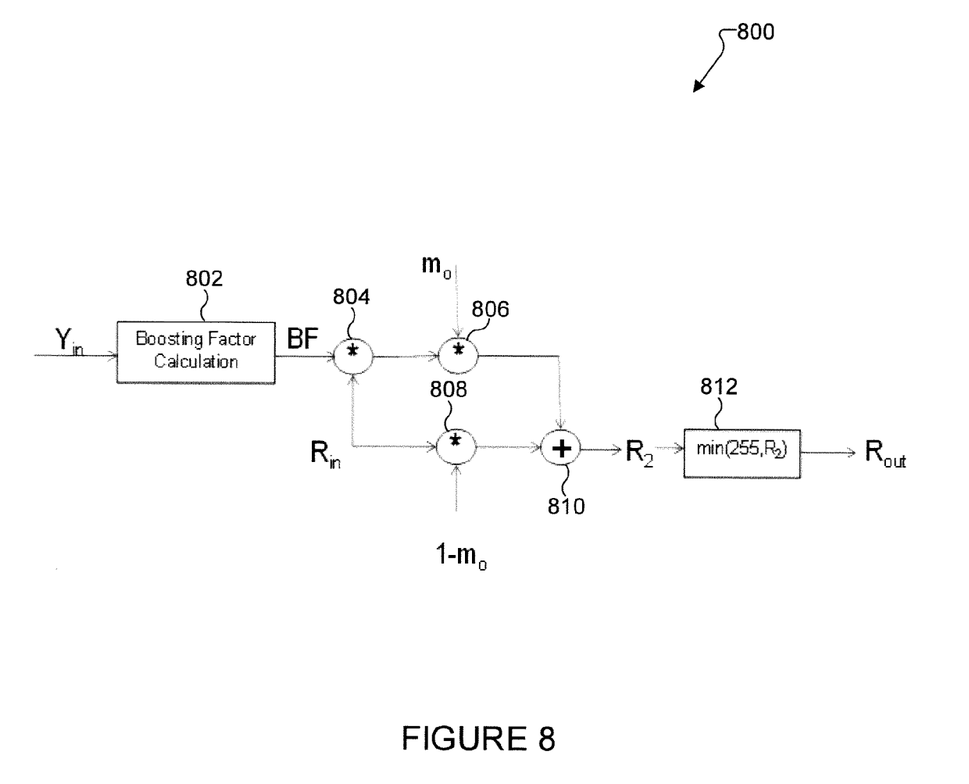
FIG. 8 illustrates an example process for post-processing enhancement of an image according to an embodiment of this disclosure.

FIG. 8 illustrates an example process 800 for post-processing enhancement of an image according to an embodiment of this disclosure. The embodiment of the process 800 illustrated in FIG. 8 is for illustration only, the process 800 comes in a wide variety of configurations, and FIG. 8 does not limit the scope of this disclosure to any particular implementation of a system for processing an image.

In this example embodiment, process 800 illustrates enhancing Red color. The other two colors Blue and Green are enhanced in a similar manner. While the masks shown herein are for YCbCr spaces (or in other color spaces), in some embodiments, enhancement may be performed in the {R,G,B} color space to avoid any color shifts, which may have happened if YCbCr is used for enhancement.

At block 802, a post-processing module can calculate a boosting factor (BF) for each pixel with input luminance $Y_{in}$ using the following equations:

$$Y_{out} = A + B\left(\frac{Y_{in} - A}{B}\right)^{\frac{1}{\alpha}} \quad (1)$$

$$BF = Y_{out}/Y_{in} \quad (2)$$

The luminance pixels in the range A to 255 are boosted. B=255−A; and α (typically α>=1) is the boosting strength.

In one example embodiment, calculating a boosting factor provides enhancement to portions an image that are greater in brightness in the image compared to other portions of the image. The portions of greater brightness are close to white and the enhancement allows these portions to look whiter. One embodiment avoids calculating a BF for Cb and Cr, as these BFs can lead to unwanted color changes in the image.

Equation 2 is just one example of an equation used for boosting (enhancing) the whiter portions with higher brightness. In different embodiments, different equations can be designed as well. In equation 1, the parameter α can be controlled by a colorist or end-user and governs the degree of white enhancement. In other embodiments, α can be preset.

At block 804, the input $R_{in}$, $G_{in}$, or $B_{in}$ for the pixels is multiplied by the boosting factor obtained at block 802 to obtain intermediate enhanced chromatics for each pixel. The intermediate enhanced chromatics for each pixel are shown as:

$$R_1 = BF * R_{in}$$

$$G_1 = BF * G_{in}$$

$$B_1 = BF * B_{in}$$

At block 806, the intermediate enhanced chromatics $R_1$, $G_1$, or $B_1$ for each pixel are multiplied by the mask $m_o$ to create a masked enhanced input. At block 808, the original pixel values $R_{in}$, $G_{in}$, or $B_{in}$ are multiplied by the mask $m_o$ to create a masked input. At block 810, the results of block 806 and 808 are summed as follows:

$$R_2 = m_o * R_1 + (1 - m_o) R_{in}$$

$$G_2 = m_o * G_1 + (1 - m_o) G_{in}$$

$$B_2 = m_o * B + (1 - m_o) B_{in}$$

At block 812, the enhanced pixels $R_2$, $G_2$, or $B_2$ are clipped for all values in RGB space, which may have gone above 255 due to boosting, as follows:

$$R_{out} = \min(R_2, 255)$$

$$G_{out} = \min(G_2, 255)$$

$$B_{out} = \min(B_2, 255)$$

In one example embodiment, the range of R, G, B is from 0-255 is used because of 8-bit SDR displays. In other embodiments, other ranges can be used.

Figure 9:
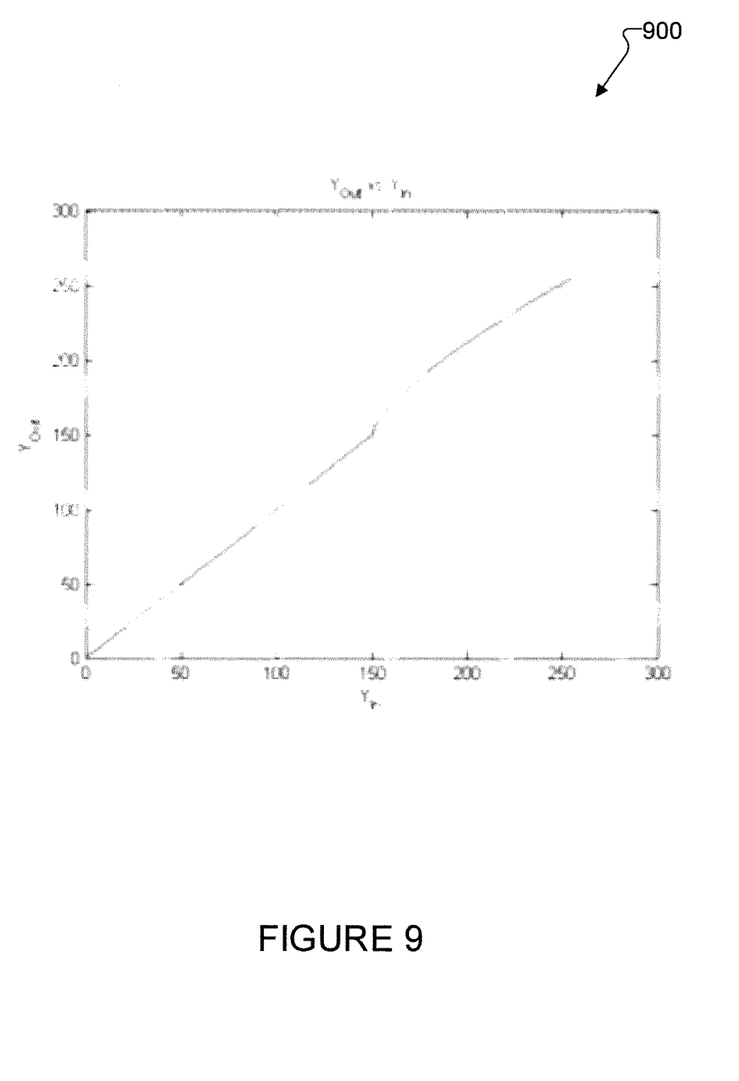
FIG. 9 illustrates an example chart for input and output luminance characteristics according embodiments of this disclosure.

FIG. 9 illustrates an example chart 900 for input and output luminance characteristics according embodiments of this disclosure. The embodiment of the chart 900 illustrated in FIG. 9 is for illustration only. Chart 900 comes in a wide variety of configurations, and FIG. 9 does not limit the scope of this disclosure to any particular implementation of a system for processing an image.

In an embodiment of this disclosure, chart 900 illustrates luminance $Y_{in}$ input corresponding to luminance $Y_{in}$ output. Using Equations 1 and 2, FIG. 8 provides an example of a curve with A=150, and α=1.4. In this example, $Y_{in}$=200 is enhanced to approximately 212.

One or more embodiments of this disclosure provide automatic α parameter tuning. The boosting strength parameter α can be chosen by a colorist or user to decide the degree of white enhancement in the image. Setting it to a very high value (for example 10) may saturate a lot of regions in most typical images towards white. To automate choosing α, a processor may be configured to perform the following three steps.

1) Decide a threshold t for allowing the maximum number of pixels in the image in any channel to be saturated. In one example, pixels in the original image saturated to 255 prior to boosting are ignored and not compared to the threshold. In other examples, other sets of pixels can be compared to the threshold.

2) With α=1 as initialization and $\alpha_{Max}$ as the maximum possible value of alpha, a processor can increment α in step-size, for example, a step-size of 0.1, until the point when the number of pixels saturated is less than t in all three color spaces, and α<=$\alpha_{Max}$.

3) The processor is configured to output the image.

One or more embodiments of this disclosure provide mask generation in other color spaces. The embodiments described in this disclosure generated masks for Cb and Cr in the YCbCr color space. Alternatively the masks can be generated based on the a and b components of the LAB color space. For each of the a and b components, a trapezium like mask can be designed similar to those for Cb and Cr. The center could be at "0", and the thresholds aThrMin, aThrMax (and similarly for b) can be chosen as "5" and guard band of aGuard (and bGuard) to be "10"'. These values are just for illustration, and other values can be used.

Figure 10:
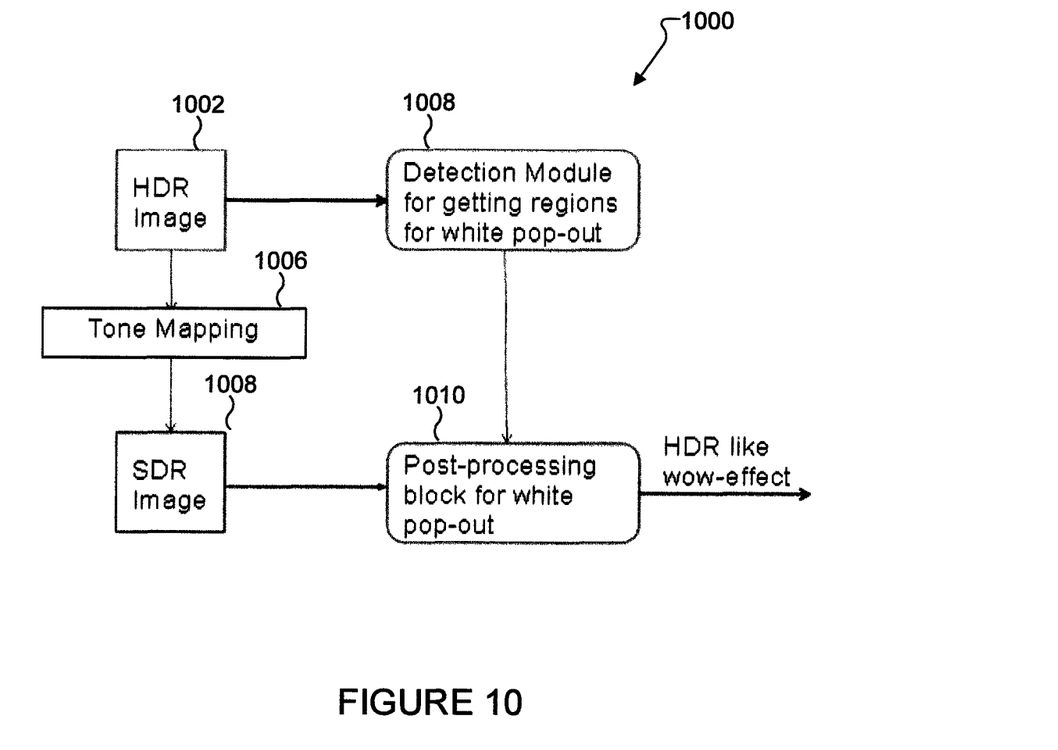
FIG. 10 illustrates an example system using an HDR image for processing an SDR image according to an embodiment of this disclosure.

FIG. 10 illustrates an example system 1000 using an HDR image 1002 for processing an SDR image 1004 according to an embodiment of this disclosure. The embodiment of the system 1000 illustrated in FIG. 10 is for illustration only, the system 1000 comes in a wide variety of configurations, and FIG. 10 does not limit the scope of this disclosure to any particular implementation of a system for processing an image.

One or more embodiments of this disclosure utilize HDR information of HDR image 1002 for detecting relevant portions of an image and using those portions for enhancement of an SDR image. In this example, the SDR image 1004 is created by tone mapping 1006 the HDR image 1002. When the HDR image 1002 is also available in addition to the SDR image 1004, the detection of the white, or near-white region will be more accurate in the HDR space as compared to the SDR space. Due to tone mapping (conversion from HDR to SDR), there is some information loss for all the pixels. One or more embodiments provide a detection mask in the HDR image space, and then use the mask is used to perform the enhancement in the SDR image.

In an embodiment of this disclosure, system 1000 includes a detection module 1008 and a post-processing module 1010. The detection module 1008 and post-processing module 1010 can be implemented as part of or by a processor, such as, for example, main processor 340 as shown in FIG. 3. The detection module 1008 identifies relevant portions of the HDR image 1002 for enhancement to form metadata with information about the relevant portions of the HDR image. The post-processing module uses the metadata provided by the detection module 1008 regarding the relevant portions of the HDR image 1002 to enhance those relevant portions on the SDR version of the image 1004.

In the HDR image 1002, at higher luminance values (e.g., at 4000 nits), a human eye contrast sensitivity function (CSF) will be able to distinguish fewer details in contrast. When using a linear tone mapping, or a tone mapping function not perceptually designed is used to tone map the HDR image 1002 to SDR image 1004, and contrast sensitivity of the eye will be more (e.g., at around 200 nits) after tone mapping in the SDR image 1004. During enhancement (boosting), that contrast level in the white area of the enhanced SDR image can be made reduced as compared to the tone mapped SDR image 1004, since in the original HDR image 1002, the contrast was less visible to the human eyes.

The metadata from the HDR image 1002 can be used to find the minimum $Y_{min,out}$ luminance value for the enhanced SDR image that should provide the same CSF as in HDR image 1002. In one example, the max luminance value can go to 255 (in 8-bit RGB images). The boosting parameter a can be computed as:

$$Y_{min,out} = A + B\left(\frac{Y_{min,in} - A}{B}\right)^{\frac{1}{\alpha}},$$

where $Y_{min,out}$ is obtained using the CSF function.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle.

What is claimed is:

1. A user equipment (UE), comprising:
a receiver configured to receive a standard dynamic range (SDR) image and metadata related to a high dynamic range (HDR) image;
a processor configured to:
identify relevant portions of the SDR image to be enhanced based on the metadata related to the HDR image;
increase an intensity of the relevant portions of the SDR image to create an enhanced SDR image by determining a boosting factor using a luminance component for each pixel of the relevant portions of the HDR image; and
output the enhanced SDR image to a display.

2. The UE of claim 1, wherein performing tone mapping on the HDR image creates the SDR image.

3. The UE of claim 1, wherein the intensity is increased for one or more of a luminance or chrominance of the SDR image.

4. The UE of claim 1, wherein the metadata includes one or more of a luminance mask or chrominance mask of the HDR image.

5. The UE of claim 4, wherein the processor configured to increase the intensity of the relevant portions of the SDR image to create the enhanced SDR image comprises the processor configured to:
apply the boosting factor to one or more color chromatics to form intermediate color chromatics.

6. The UE of claim 5, wherein the processor configured to increase the intensity of the relevant portions of the SDR image to create the enhanced SDR image comprises the processor configured to:
apply the one or more of a luminance or chrominance mask to the one or more color chromatics to create a masked input;
apply an inverse of one or more of a luminance or chrominance mask to the intermediate color chromatics to create a masked enhanced color input; and
sum the masked color input and the masked enhanced input to create enhanced color chromatics.

7. The UE of claim 6, wherein the processor configured to increase the intensity of the relevant portions of the SDR image to create the enhanced SDR image comprises the processor configured to:
reduce any of the enhanced color chromatics above a predetermined value to the predetermined value.

8. The UE of claim 4, wherein the processor configured to determine the boosting factor using the luminance component for each pixel of the relevant portions of the HDR image comprises the processor configured to:
determine the boosting factor where a number of saturated pixels of the SDR image are less than a threshold number of pixels.

9. The UE of claim 6, wherein the processor configured to increase the intensity of the relevant portions of the SDR image to create the enhanced SDR image comprises the processor configured to:
identify any saturated pixels of the HDR image; and
saturate pixels of the SDR image corresponding to the saturated pixels of the HDR image.

10. The UE of claim 1, wherein the HDR image and the SDR image depict similar content.

11. A method for image enhancement, comprising:
receiving a standard dynamic range (SDR) image and metadata related to a high dynamic range (HDR) image;
identifying relevant portions of the SDR image to be enhanced based on the metadata related to the HDR image;
increasing an intensity of the relevant portions of the SDR image to create an enhanced SDR image by determining a boosting factor using a luminance component for each pixel of the relevant portions of the HDR image; and
outputting the enhanced SDR image to a display.

12. The method of claim 11, wherein performing tone mapping on the HDR image creates the SDR image.

13. The method of claim 11, wherein the intensity is increased for one or more of a luminance or chrominance of the SDR image.

14. The method of claim 11, wherein the metadata includes one or more of a luminance mask or chrominance mask of the HDR image.

15. The method of claim 14, wherein increasing the intensity of the relevant portions of the SDR image to create the enhanced SDR image comprises:
applying the boosting factor to one or more color chromatics to form intermediate color chromatics.

16. The method of claim 15, wherein increasing the intensity of the relevant portions of the SDR image to create the enhanced SDR image comprises:
applying the one or more of a luminance or chrominance mask to the one or more color chromatics to create a masked input;
applying an inverse of one or more of a luminance or chrominance mask to the intermediate color chromatics to create a masked enhanced color input; and
summing the masked color input and the masked enhanced input to create enhanced color chromatics.

17. The method of claim 16, wherein increasing the intensity of the relevant portions of the SDR image to create the enhanced SDR image comprises:
reducing any of the enhanced color chromatics above a predetermined value to the predetermined value.

18. The method of claim 16, wherein increasing the intensity of the relevant portions of the SDR image to create the enhanced SDR image comprises:
identifying any saturated pixels of the HDR image; and
saturating pixels of the SDR image corresponding to the saturated pixels of the HDR image.

19. The method of claim 14, wherein determining the boosting factor using the luminance component for each pixel of the relevant portions of the HDR image comprises:
determining the boosting factor where a number of saturated pixels of the SDR image are less than a threshold number of pixels.

20. The method of claim 11, wherein the HDR image and the SDR image depict similar content.

* * * * *